United States Patent
Kim

[19]

[11] Patent Number: 5,963,340
[45] Date of Patent: Oct. 5, 1999

[54] METHOD OF AUTOMATICALLY AND SELECTIVELY STORING FACSIMILE DOCUMENTS IN MEMORY

[75] Inventor: Tae-Han Kim, Gumi, Rep. of Korea

[73] Assignee: SamSung Electronics Co., Ltd., Suwon, Rep. of Korea

[21] Appl. No.: 08/782,895

[22] Filed: Dec. 27, 1996

[30] Foreign Application Priority Data

Dec. 27, 1995 [KR] Rep. of Korea ................ 95/59426

[51] Int. Cl.⁶ ..................................................... H04N 1/00
[52] U.S. Cl. ................................................ 358/440; 358/404
[58] Field of Search ......................... 358/400, 404, 358/440, 434, 435, 436, 437, 438, 439, 442, 441, 401, 471; 379/100.06, 100.01, 100.02

[56] References Cited

U.S. PATENT DOCUMENTS

| | | | |
|---|---|---|---|
| 5,168,376 | 12/1992 | Motohama | 358/437 |
| 5,239,385 | 8/1993 | Ejiri | 358/434 |
| 5,274,467 | 12/1993 | Takehiro | 358/440 |
| 5,293,253 | 3/1994 | Kida | 358/440 |
| 5,307,178 | 4/1994 | Yoneda | 358/440 |
| 5,349,447 | 9/1994 | Kuwahara | 358/404 |
| 5,379,124 | 1/1995 | Ikegaya et al. | 358/440 |
| 5,386,303 | 1/1995 | Kihara | 358/405 |
| 5,508,819 | 4/1996 | Yanagisawa | 358/404 |

*Primary Examiner*—Jerome Grant, II
*Attorney, Agent, or Firm*—Robert E. Bushnell, Esq.

[57] ABSTRACT

A method of automatically and selectively storing documents in memory in a facsimile system, includes the steps of: registering a telephone number of predetermined facsimile transmission sources in memory when a reception-to-memory registration function key is input; checking if an automatic data storage function key is selected, when facsimile data is received; detecting whether a telephone number of a sending station loaded in a non-standard code matches a telephone number previously registered in memory, when the automatic data storage function is selected; and automatically storing a document in memory where a match was found.

20 Claims, 6 Drawing Sheets

METHOD OF AUTOMATICALLY AND SELECTIVELY STORING FACSIMILE DOCUMENTS IN MEMORY

CLAIM FOR PRIORITY UNDER 35 U.S.C. §119

This application makes reference to, incorporates the same herein, and claims all benefits accruing under 35 U.S.C. §119 from an application for Method Of Automatically And Selectively Storing Facsimile Documents In Memory earlier filed in the Korean Industrial Property Office on Dec. 27, 1995, and there duly assigned Ser. No. 59426/1995.

BACKGROUND OF THE INVENTION

1. Technical Field

This invention relates to a facsimile system, and more particularly relates to a facsimile system and a process of automatically and selectively receiving facsimile transmission for storage in memory when the facsimile system is set in an automatic memory reception mode, and for allowing an authorized operator to access the memory to print the received facsimile transmission.

2. Background Art

Conventional facsimile systems available in the market today contain a long list of sophisticated options for the convenience of users. For facsimile systems used primarily in an office environment, one of those convenient service features is to allow acceptance of an incoming facsimile document only from a particular facsimile transmission source and substantially restrict facsimile communication with other facsimile transmission sources for the purpose of securing its confidential information and avoiding unwanted facsimile transmission, particularly from those for fun or advertising facsimile transmission such as direct mail. Exemplary configurations of such facsimile systems are disclosed, for example, in U.S. Pat. No. 5,168,376 for Facsimile Machine And Its Security Control Method issued to Motohama, U.S. Pat. No. 5,274,467 for Facsimile Apparatus Capable of Desired Processing Dependent On Terminal Number Of Calling Party issued to Takehiro et al., U.S. Pat. No. 5,293,253 for Facsimile Apparatus For Receiving Facsimile Transmission Selectively issued to Kida et al., U.S. Pat. No. 5,307,178 for Facsimile Terminal Equipment issued to Yoneda, and U.S. Pat. No. 5,349,447 for Facsimile Machine issued to Kuwahara et al.

Typically, the facsimile system as disclosed requires that telephone numbers of predetermined facsimile transmission sources be initially registered in an internal memory. After the telephone numbers of the predetermined facsimile transmission sources are registered in the internal memory, the facsimile system carries out comparison of the telephone number of a calling station with the telephone number registered in the internal memory upon reception of an incoming call. As a result, the facsimile system can either accept or reject the facsimile transmission. The facsimile system accepts the facsimile transmission only when the telephone number of the calling station is included in the list of telephone numbers that is registered in the internal memory as acceptable facsimile transmission sources. When the telephone number of the calling station does not correspond to any of the telephone numbers registered in the internal memory, the reception of the facsimile transmission is rejected. Once accepted, the facsimile transmission can be printed directly or indirectly.

Some recent facsimile systems as those disclosed, for example, in U.S. Pat. No. 5,379,124 for Facsimile System issued to Ikegaya et al., further rely on the comparison of a telephone number of the calling station with a list of telephone numbers of a predetermined facsimile transmission sources to determine a remaining memory capacity of an image memory so as to store the facsimile document in the image memory, while others as those disclosed, for example, in U.S. Pat. No. 5,239,385 for Communication Apparatus issued to Ejiri, rely on such a comparison to receive the facsimile document in either an automatic reception mode or a manual reception mode.

In such conventional facsimile systems, however, there is insufficient security measure to protect privacy and confidential information. As I have also observed, there is no provision for the facsimile system to effectively manage acceptance of facsimile transmission in different modes of operation. Moreover, there is no provision for multiple users to manage their acceptance of facsimile transmission and protect their own confidential information if the facsimile system is intended for operation in an office environment.

SUMMARY OF THE INVENTION

Accordingly, it is therefore an object of the present invention to provide an improved facsimile system and process.

It is also an object to provide an improved facsimile system and process of automatically and selectively accepting facsimile transmissions for storage in memory.

It is another object to provide an improved facsimile system and process of providing security measure to protect privacy and confidential information.

It is yet another object to provide an improved facsimile system and process of effectively manage acceptance of facsimile transmission in different modes of operation.

It is further an object to provide an improved facsimile system and process of permitting multiple users to manage their acceptance of facsimile transmission while concomitantly protecting their own confidential information.

The present invention is a method of automatically and selectively storing transmissions in memory of a facsimile system, including the steps of: registering a telephone number of a predetermined facsimile transmission source in a first memory, when a reception-to-memory registration key is input; receiving a facsimile signal from a sending station via a telephone line; determining whether an automatic data storage function is selected; determining whether a telephone number of the sending station matches the telephone number previously registered in the first memory, when the automatic data storage function is selected; and automatically storing a facsimile document in a second memory, when the telephone number of the sending station matches the telephone number previously registered in the first memory.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
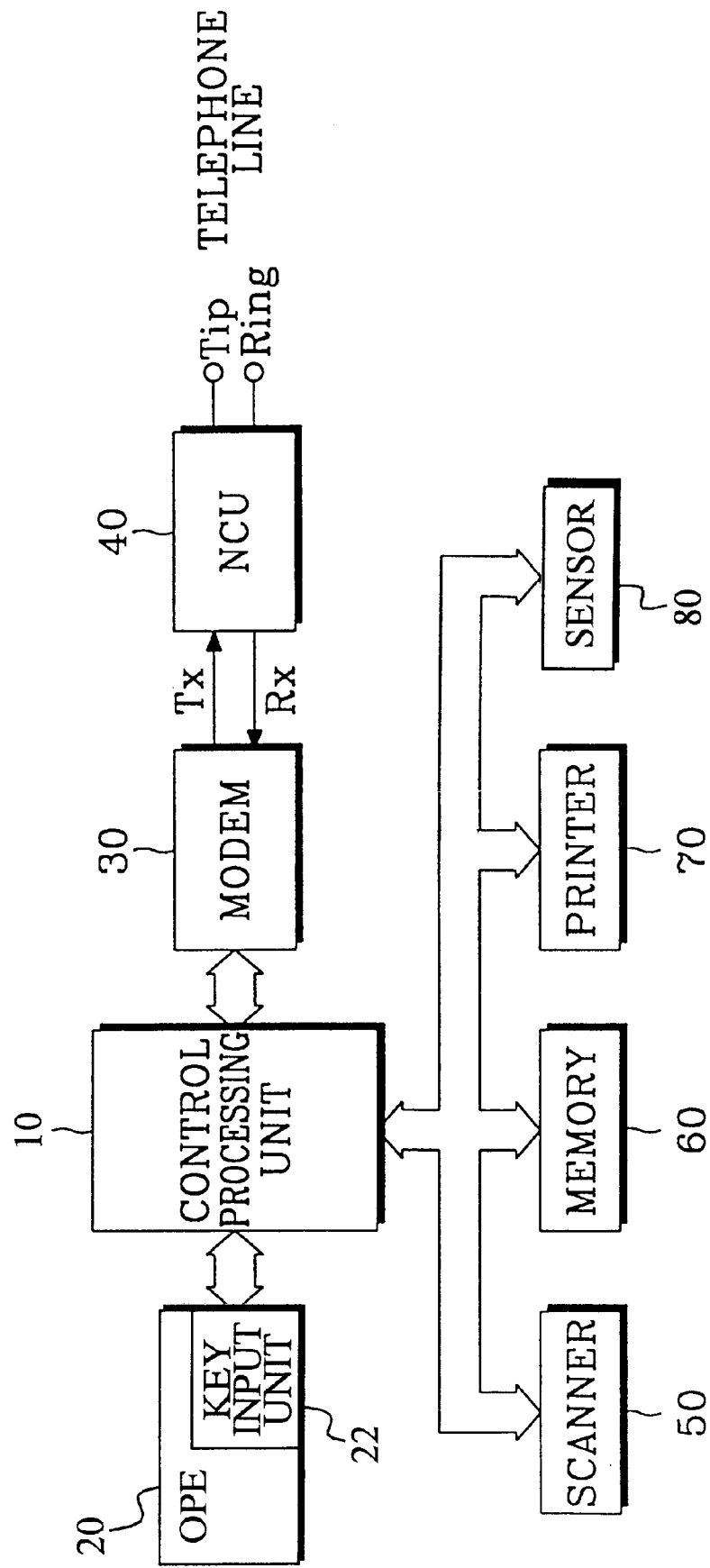
FIG. 1 is a block diagram of a facsimile system constructed according to the principles of the present invention.

Referring now to the drawings and particularly to FIG. 1, which illustrates a facsimile system constructed according to the principles of the present invention. The facsimile system includes a controller 10 for controlling operations of the facsimile system, an operational panel OPE 20 including a key input unit 22, a network control unit NCU 40 connected to a tip and ring terminal of a telephone line, a modem 30, a scanner 50, a memory 60, a printer 70, a sensor 80, and a telephone (not shown).

The controller 10 includes a central processing unit (CPU) for controlling operations of the facsimile system, and a program memory such as a ROM (not shown) which stores a program for the controller 10 to control the general operation of the facsimile system for transmission or reception of image data from another facsimile system, and programs for setting a reception-to-memory reception function, and an automatic memory reception function for automatically and selectively receiving facsimile document for storage in memory and subsequent printing according to the principles of the present invention.

The memory 60 contains a buffer and a data memory such as a RAM (not shown) which temporarily stores a variety of items of information. The buffer includes a password area for storing a secret password of an operator of the facsimile system and/or storing passwords of a plurality of operators assigned to use the same facsimile system, an identification (ID) memory area for storing a list of telephone numbers of a predetermined group of facsimile transmission sources, i.e., senders' facsimile systems. The data memory stores data information reflecting the facsimile document received from the predetermined facsimile transmission sources when the facsimile system is set in an automatic memory reception mode after the telephone numbers of the predetermined facsimile transmission sources are registered in the buffer.

The OPE 20 includes a key input unit 22 and a display unit. The key input unit 22 of the OPE 20 comprises a plurality of discrete keys including a dial key for generating key data to the controller 10 to dial a telephone number of another facsimile system, a reception-to-memory registration function key for allowing the operator to register a single or a plurality of telephone numbers of a predetermined group of facsimile transmission sources in the buffer of memory 20, an automatic data storage key for allowing the operator to set the facsimile system in an automatic memory reception function. Once the telephone numbers of the predetermined facsimile transmission sources are registered in the buffer of memory 60, a list as obtained is used to determine whether a document i.e., facsimile messages received from the telephone line will be accepted for storage in the data memory of memory 60. The display unit of the OPE 20 displays data indicating various modes of operations of the facsimile system. The sensor 80 senses whether a document is input into the facsimile system, or whether copy paper is stored and available for use, and generates an indicative signal to the controller 10. The scanner 50 transports and scans an image of the input document and then generates image data corresponding to the scanned image. The image data output from the scanner 50 is then processed for either transmission via a telephone line or copy during the copy mode under control of the controller 10. The printer 70 prints the processed image data received from the NCU 40 on a printable medium such as individual cut sheets of papers during the reception mode and the copy mode under the control of the controller 10. The modem 30 modulates the processed image data output from the controller 10 into a modulated image signal for transmission, and duplicates the image signal input to the controller 10 during the reception mode under the control of the controller 10. The NCU 40 is connected with a tip and ring terminals of a telephone line to form transmission and reception paths for the modem 30 under the control of the controller 10.

Figure 2:
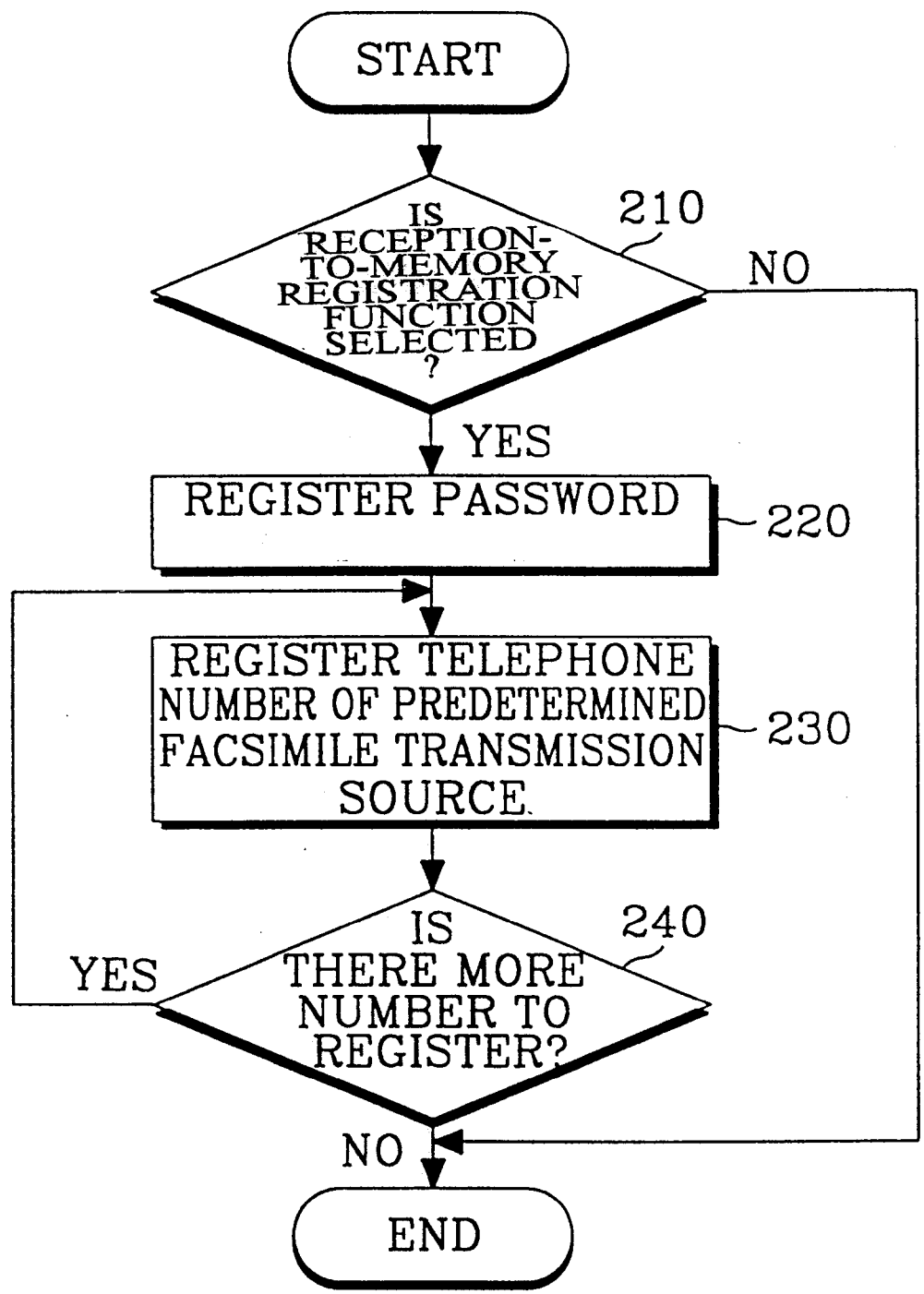
FIG. 2 is a flow chart illustrating a process of setting a reception-to-memory registration function according to a preferred embodiment of the present invention.

Turning now to FIG. 2 which illustrates a process of setting a reception-to-memory registration function in the facsimile system according to a preferred embodiment of the present invention. The process essentially requires the operator to first depress a reception-to-memory registration function key at the key input unit to allow registration of a secret password and telephone numbers of predetermined facsimile transmission sources in the buffer of memory for subsequent authorized acceptance of facsimile transmission from any one of those registered facsimile transmission sources.

Figure 3:
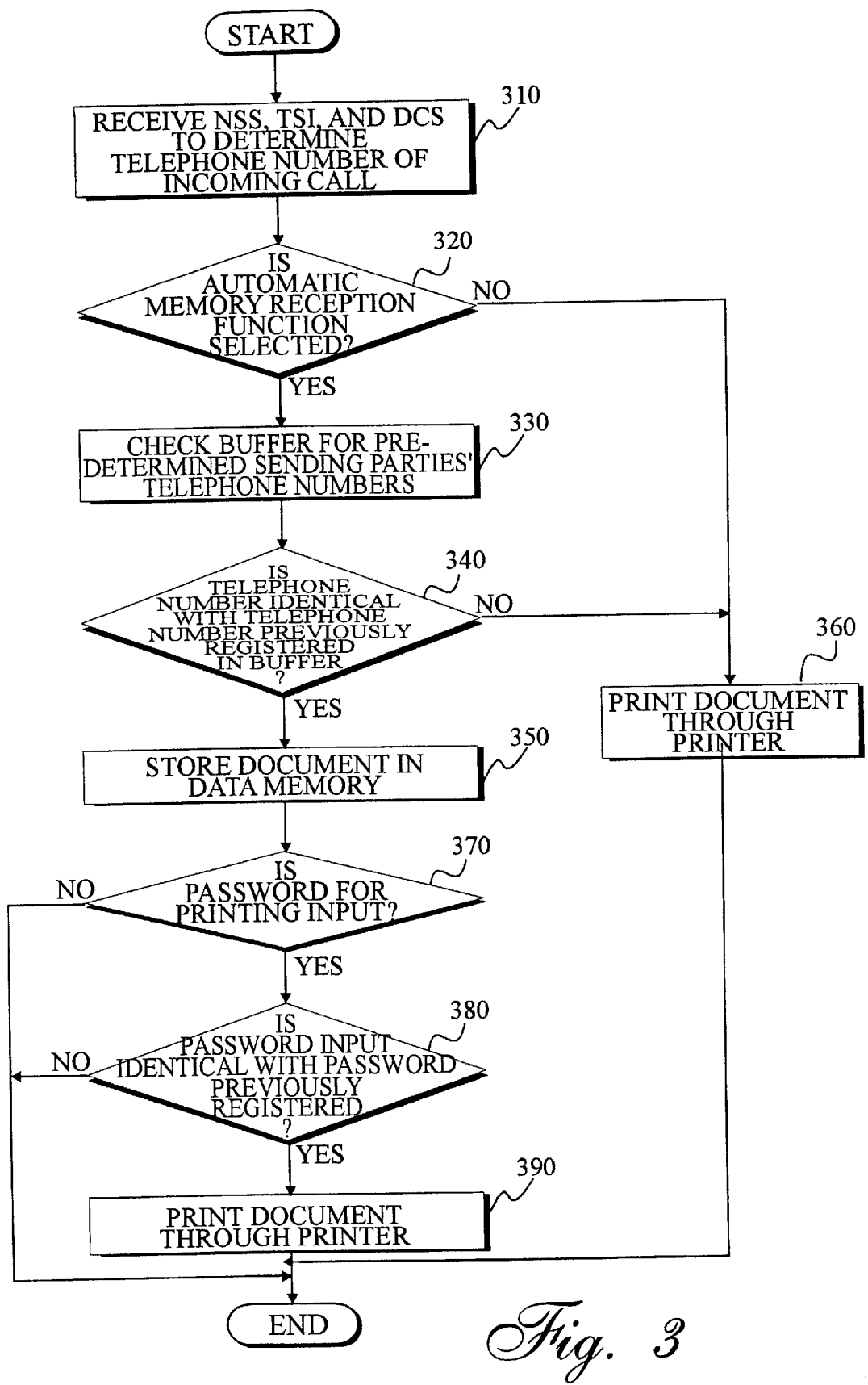
FIG. 3 is a flow chart illustrating a process of automatically and selectively receiving facsimile document for storage in memory and subsequent printing according to a preferred embodiment of the present invention.

When the telephone numbers of the predetermined facsimile transmission sources are registered in the buffer of memory, the list obtained is used, as shown in FIG. 3, to determine whether a document i.e., facsimile messages received from the telephone line will be automatically and selectively accepted for storage in the data memory. After the facsimile document is stored in the data memory, only an authorized operator, i.e., the operator whose password is registered in the buffer of memory, is allowed to access to the facsimile document as stored in the data memory for a print out.

The operation of the preferred embodiment of the present invention will now be described in detail with reference to FIG. 1 and the flow charts of FIGS. 2 and 3.

First, the process of registering a password and telephone numbers of predetermined facsimile transmission sources in the memory is described as follows: As shown in FIG. 2, CPU 10 determines whether a reception-to-memory registration function key is selected from key input unit 22 at step 210. When the reception-to-memory function key is selected from key input unit 22, CPU 10 controls the display unit of OPE 20 to provide a visual display of a message informing the operator to register his or her print authorization password of preferably four digits in the buffer of memory 60 at step 220. After the password is registered in the buffer of memory 60 at step 220, CPU 10 controls the display unit of OPE 20 to provide a visual display of a message informing the operator to register a telephone number of a predetermined facsimile transmission source at step 230. After each telephone number of a predetermined facsimile transmission source is registered at step 230, CPU 10 determines whether is there more telephone number for registration at step 240. If there is more telephone number for registration at step 240, CPU 10 returns to step 230 to register additional telephone number. However, if there is no more telephone number for registration at step 240, CPU 10 terminates the program.

When facsimile transmission is received from the telephone line as shown in FIG. 3, CPU 10 receives non-standard codes such as non-standard facilities set up (NSS), and transmission subscriber identification (TSI), and digital command signal (DCS) according to general facsimile protocol to determine a telephone number of an incoming call at step 310. After the NSS/TSI/DSC are received at step 310, the CPU 10 determines whether an automatic memory reception function key is selected from key input unit at step 320, i.e., whether the facsimile system is set in an automatic memory reception mode. If the automatic memory reception function key is not selected from key input unit at step 320, CPU 10 recognizes that the facsimile system is in a normal. This way the operator has the option to receive all facsimile transmission indiscriminately and to send the received facsimile document to the printer 70 for direct printing.

When the automatic memory reception function key is selected from key input unit at step 320, CPU 10 checks the buffer for telephone numbers of the predetermined facsimile transmission sources at step 330. Then, the CPU 10 determines whether the telephone number of the sending station as loaded in TSI is identical to any of the telephone numbers previously registered in the buffer of memory 60 at step 340. If the telephone number of the sending station does not match any of the telephone numbers previously registered in the buffer of memory 60 at step 340, CPU 10 sends the received facsimile document to the printer 70 for direct printing at step 360. Optionally, the CPU 10 may be programmed to avoid unwanted facsimile transmission from unknown facsimile transmission sources. If this is intended, then the CPU 10 alternatively terminates the program and rejects reception of the facsimile document.

When the telephone number of the sending station matches any of the telephone numbers previously registered in the buffer of memory 60 at step 340, however, the CPU 10 stores the facsimile document in the data memory of memory 60 at step 350. After the facsimile document is stored in the data memory of memory 60, the CPU 10 checks if a password is input through the key input unit 10 for access to the data memory at step 370. If the password is input through the key input unit 10, the CPU 10 makes a comparison between the password entered with the password which is previously stored in the buffer of memory 60 at step 380. When there is a match between the two passwords, CPU 10 sends a control signal to the printer 70 so as to print out the document stored in memory 60, and then terminates the program. If, however, there is no match between the input password and the password previously registered in buffer of memory 60, the CPU 10 terminates the program.

Figure 4:
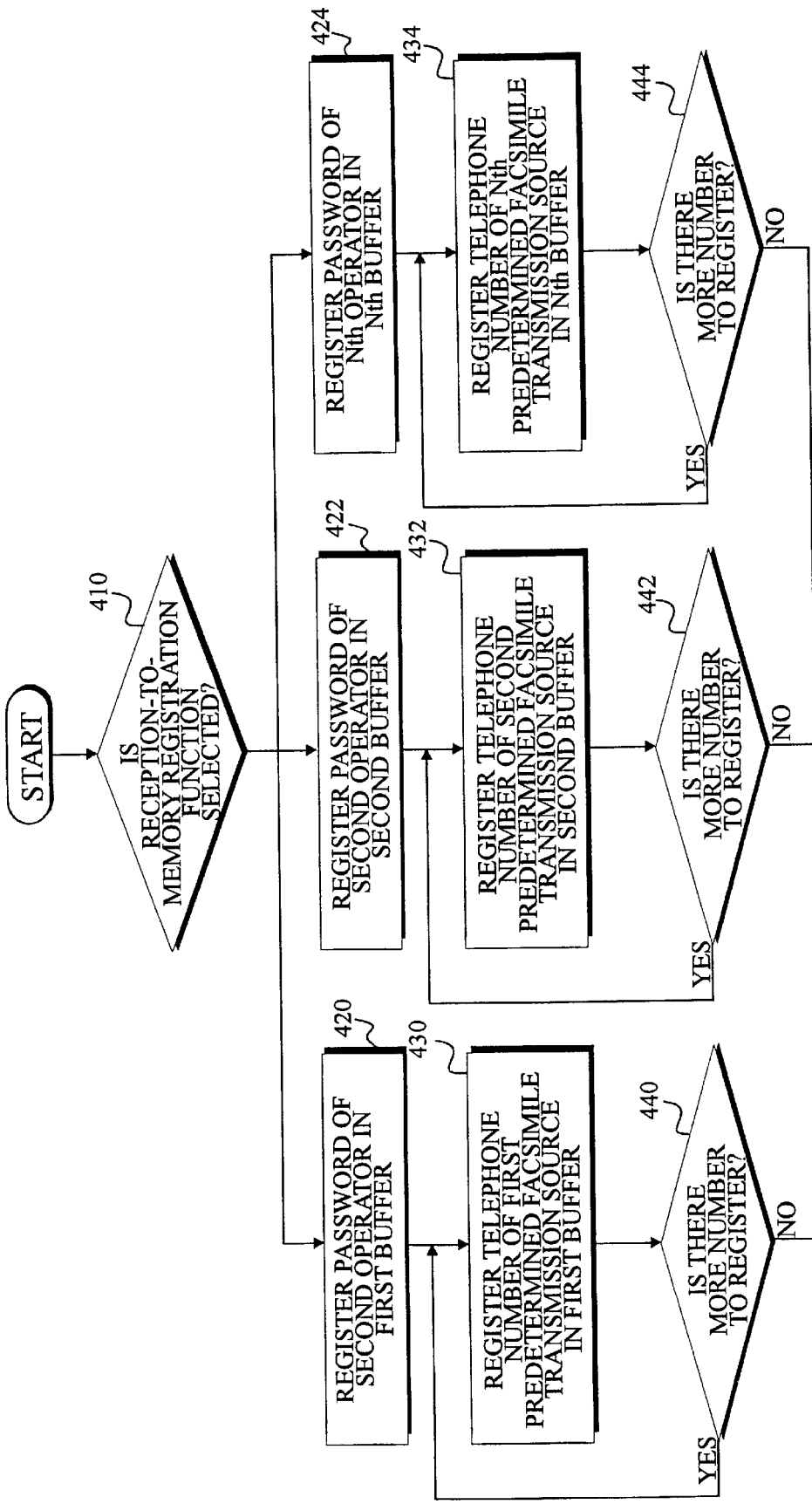
FIG. 4 is a flow chart illustrating a process of setting a reception-to-memory registration function according to another embodiment of the present invention.

Refer now to FIG. 4 which illustrates a process of setting a reception-to-memory registration function according to another embodiment of the present invention. In this embodiment, the present invention contemplates a situation where the facsimile system is a central communication system of an office serving multiple users to manage their acceptance of facsimile transmission and protect their own confidential information. Each user or operator can then share the facsimile system and remain secured with password protection. However, the number of users is dictated by the memory capacity of memory 60. For example, if the memory 60 has capacity to store data information for three (3) users, then only three users are allowed to register their print authorization password and their list of predetermined facsimile transmission sources in the memory 60.

As shown in FIG. 4, the CPU 10 first determines whether a reception-to-memory registration function key is selected from key input unit 22 at step 410. When the reception-to-memory function key is selected from key input unit 22, CPU 10 controls the display unit of OPE 20 to provide a visual display of a message informing each of the three operators to register his or her print authorization password in the buffer of memory 60 at steps 420, 422, 424, respectively. After the password is registered in the buffer of memory 60, CPU 10 controls the display unit of OPE 20 to provide a visual display of a message informing the respective operator to register a telephone number of a predetermined facsimile transmission source in the respective first, second, and Nth or third buffer of memory 60 at steps 430, 432, 434, respectively. After each telephone number of a predetermined facsimile transmission source is registered, CPU 10 determines whether is there more telephone number for registration at steps 440, 442, 444, respectively. If there is more telephone number for registration, CPU 10 returns to steps 430, 432, 434 respectively to register additional telephone number. However, if there is no more telephone number for registration, CPU 10 terminates the program.

Figure 5A:
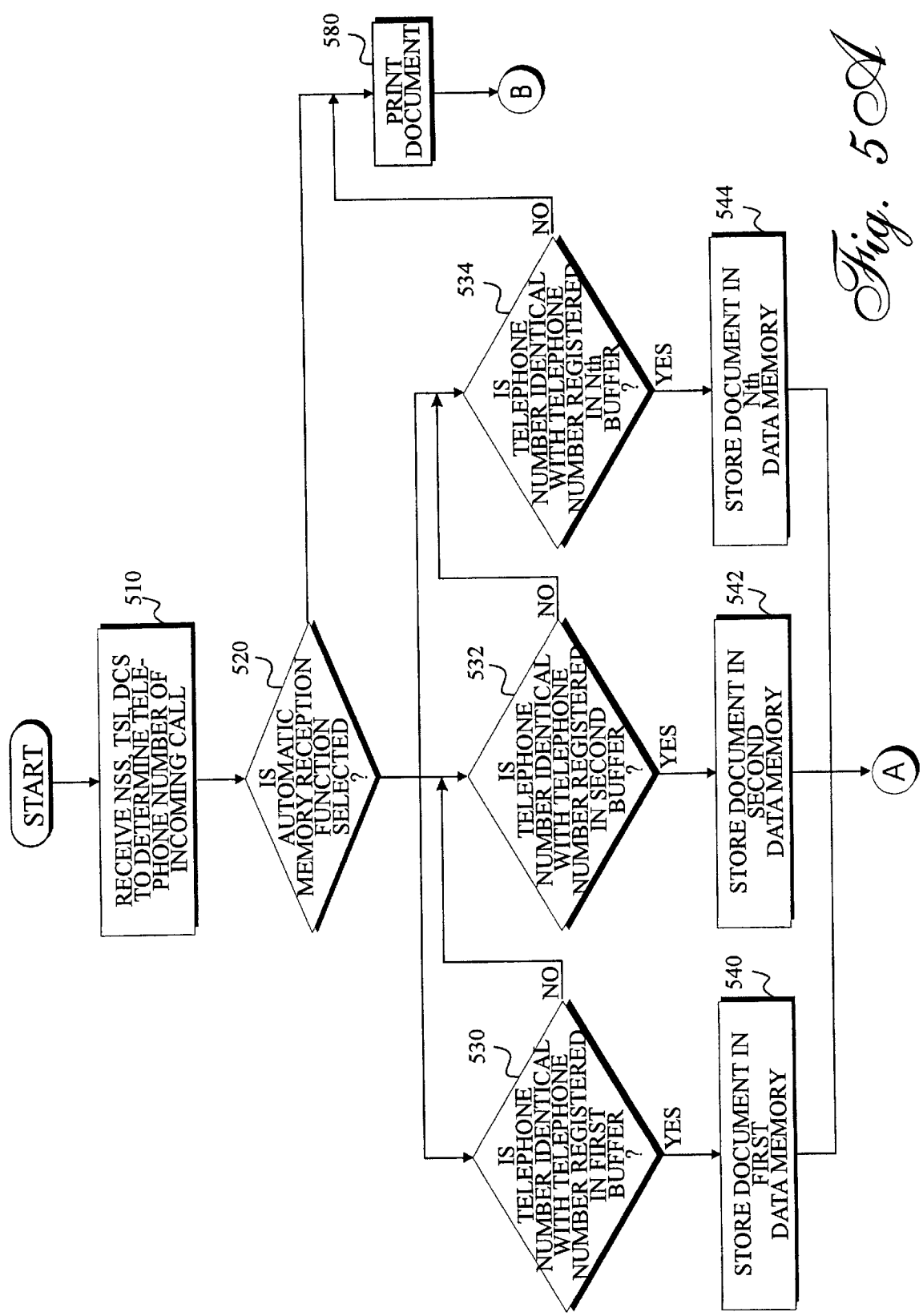
FIGS. 5A and 5B are flow charts illustrating a process of automatically and selectively receiving facsimile document for storage in memory and subsequent printing according to another embodiment of the present invention.
Figure 5B:
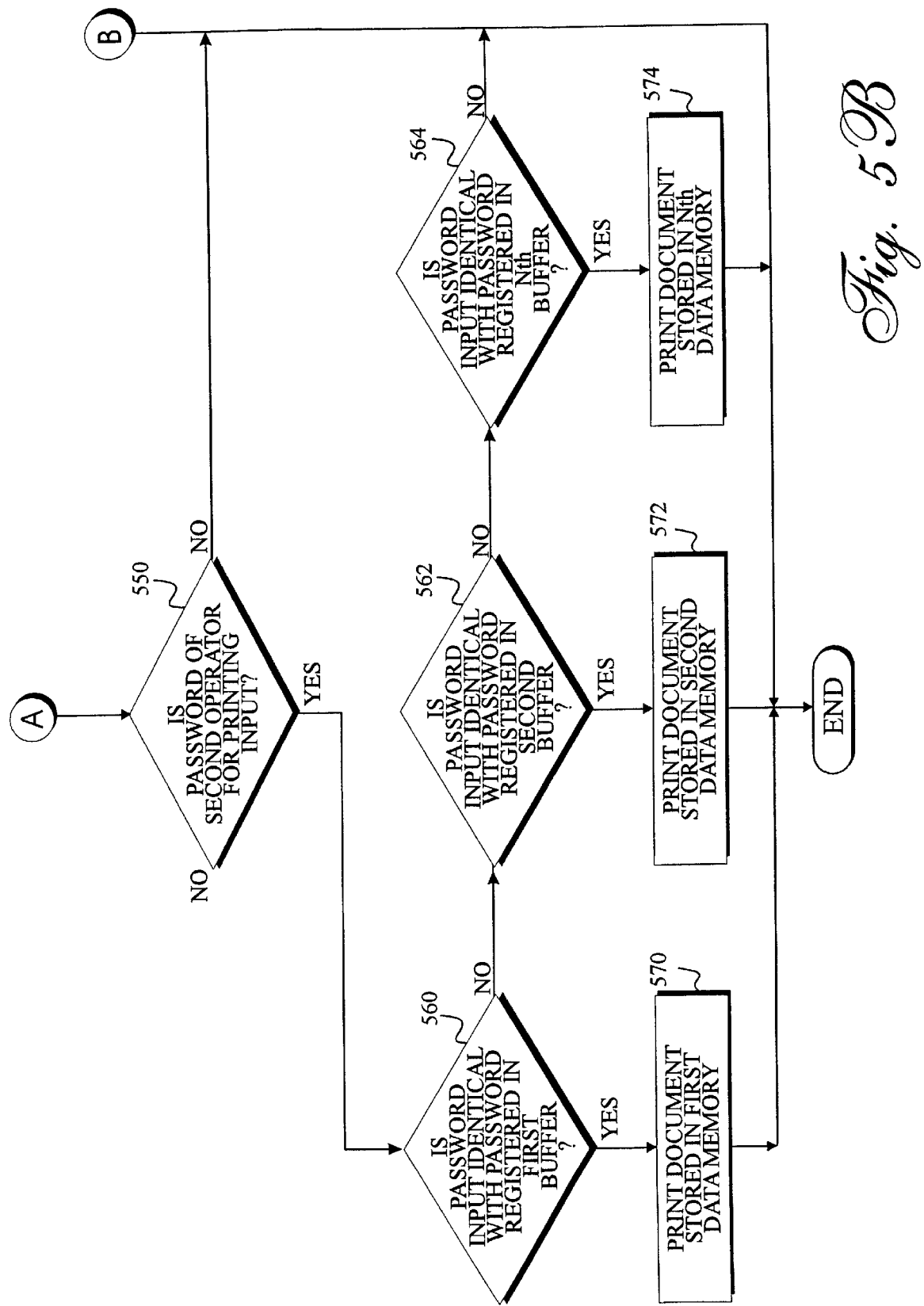

When facsimile transmission is received from the telephone line as shown in FIGS. 5A and 5B, CPU 10 receives non-standard codes such as non-standard facilities set up (NSS), and transmission subscriber identification (TSI), and digital command signal (DCS) according to general facsimile protocol to determine a telephone number of an incoming call at step 510. After the NSS/TSI/DSC are received, the CPU 10 determines whether an automatic memory reception function key is selected from key input unit at step 520, i.e., whether the facsimile system is set in an automatic memory reception mode. If the automatic memory reception function key is not selected from key input unit at step 520, CPU 10 recognizes that the facsimile system is in a normal. This way the operator has the option to receive all facsimile transmission indiscriminately and to send the received facsimile document to the printer 70 for direct printing at step 580.

When the automatic memory reception function key is selected from key input unit at step 520, CPU 10 checks the first, second, and third buffer for telephone numbers of the predetermined facsimile transmission sources, and then, sequentially determines whether the telephone number of the sending station as loaded in TSI is identical to any of the telephone numbers previously registered in the first, second, and third buffer of memory 60 at respective steps 530, 532, 534. If the telephone number of the sending station does not match any of the telephone numbers previously registered in any of the first, second, and third buffer of memory 60, CPU 10 sends the received facsimile document to the printer 70 for direct printing at step 580. Again, the CPU 10 may be optionally programmed to avoid unwanted facsimile transmission from unknown facsimile transmission sources. If this is intended, then the CPU 10 alternatively terminates the program and rejects reception of the facsimile document.

When the telephone number of the sending station matches any of the telephone numbers previously registered in the first, second, and third buffer of memory 60, however, the CPU 10 stores the facsimile document in the respective first, second, and third data memory of memory 60 at step 540, 542, 544. After the facsimile document is stored in the respective first, second, and third data memory of memory 60, the CPU 10 checks if a password is input through the key input unit 10 for access to the data memory at step 550. If the password is input through the key input unit 10, the CPU 10 makes a sequential comparison between the password entered with the password which is previously stored in the respective first, second, and third buffer of memory 60 at respective steps 560, 562, 564. When there is a match between the two passwords, CPU 10 sends a control signal to the printer 70 so as to print out the document stored in memory 60 at respective steps 570, 572, 574, and then terminates the program. If, however, there is no match between the input password and the password previously registered in buffer of memory 60, the CPU 10 terminates the program.

As described above, the present invention advantageously provides a facsimile system that is compatible with all the other facsimile systems so as to automatically storing facsimile data in memory regardless the type of facsimile systems. The facsimile system constructed according to the principles of the present invention advantageously provides security measure to protect privacy and confidential information and effectively manages avoidance of unwanted facsimile transmission and acceptance of facsimile transmission in different modes of operation. In addition, the present invention allows multiple users to manage their acceptance of facsimile transmission and protect their own confidential information if the facsimile system is intended for operation in an office environment with many people.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method of automatically and selectively storing documents in a facsimile system serving multiple users, said method comprising the steps of:

registering a first telephone number of a first predetermined facsimile transmission source in a first buffer of a first memory, and registering a first password of a first user in said first buffer of said first memory, when a reception-to-memory registration key is input;

registering a second telephone number of a second predetermined facsimile transmission source in a second buffer of said first memory and registering a second password of a second user in said second buffer of said first memory when a reception-to-memory registration key is input;

receiving a facsimile signal from a sending station via a telephone line;

determining whether an automatic data storage function is selected;

determining whether a telephone number of the sending station included in said facsimile signal matches the first telephone number previously registered in said first buffer of said first memory, when the automatic data storage function is selected;

determining whether the telephone number of the sending station included in said facsimile signal matches the second telephone number previously registered in said second buffer of said first memory, when the automatic data storage function is selected;

automatically storing a facsimile document corresponding to said facsimile signal in a first buffer of a second memory, when the telephone number of the sending station matches the first telephone number previously registered in said first buffer of said first memory;

automatically storing the facsimile document in a second buffer of said second memory, when the telephone number of the sending station matches the second telephone number previously registered in said second buffer of said first memory, when the facsimile document is stored in said first buffer of said second memory, determining whether an input password for printing the facsimile document as stored in said first buffer of said second memory matches the first password previously registered in said first buffer of said first memory;

when the facsimile document is stored in said second buffer of said second memory, determining whether the input password for printing the facsimile document as stored in said second buffer of said second memory matches the second password previously registered in said second buffer of said first memory;

when the input password matches the first password previously registered in said first buffer of said first memory, printing the facsimile document stored in said first buffer of said second memory;

when the input password matches the password previously registered in said second buffer of said first memory, printing the facsimile document stored in said second buffer of said second memory; and when the input password does not match the first password and does not match the second password previously registered in said first memory, denying printing of the facsimile document stored in said second memory.

2. The method of claim 1, further determining whether the telephone number of the sending station included in said facsimile signal matches any of a partiality of additional telephone numbers previously registered in said first memory prior to storing any facsimile document in said second memory.

3. The method of claim 1, further immediately printing the facsimile document as received from the telephone line, when the telephone number of the sending station does not match any of the telephone numbers previously registered in said first memory.

4. The method of claim 1, further immediately rejecting reception of the facsimile document from the telephone line, when the telephone number of the sending station does not match any of the telephone numbers previously registered in said first memory.

5. The method of claim 1, further immediately printing the facsimile document as received from the telephone line, when the automatic data storage function is not selected.

6. The method of claim 1, further registering additional telephone numbers of additional predetermined facsimile transmission sources in said first buffer of said first memory, and maintaining a list of all telephone numbers registered in said first buffer of said first memory.

7. The method of claim 6, further determining whether the telephone number of the sending station included in said facsimile signal matches any of the telephone numbers previously registered in said first buffer of said first memory prior to storing any facsimile document in said first buffer of said second memory.

8. A method of automatically and selectively storing documents in memory in a facsimile system serving multiple users, the method comprising the steps of:

registering a first password of a first user in a first buffer of a first memory;

registering a second password of a second user in a second buffer of said first memory;

registering a first telephone number of a first predetermined facsimile transmission source in said first buffer of said first memory, when a reception-to-memory registration key is input;

registering a second telephone number of a second predetermined facsimile transmission source in said second buffer of said first memory, when a reception-to-memory registration key is input:

registering a third telephone number of a third predetermined facsimile transmission source in said second buffer of said first memory, when a reception-to-memory registration key is input;

receiving a facsimile signal from a sending station via a telephone line;

determining whether an automatic data storage function is selected;

determining whether a telephone number of the sending station matches the first telephone number previously registered in said first buffer of said first memory, when the automatic data storage function is selected;

determining whether the telephone number of the sending station matches the second telephone number previously registered in said second buffer of said first memory,when the automatic data storage function is selected;

determining whether the telephone number of the sending station matches the third telephone number previously registered in said second buffer of said first memory, when the automatic data storage function is selected;

automatically storing a facsimile document in a first buffer of a second memory, when the telephone number of the sending station matches the first telephone number previously registered in said first buffer of said first memory.

automatically storing facsimile document in a second buffer of said second memory when the telephone number of the sending station matches the second telephone number previously registered in said second buffer of said first memory;

automatically storing the facsimile document in a second buffer of said second memory, when the telephone number of the sending station matches the third telephone number previously registered in said second buffer of said first memory;

determining whether an input password for printing the facsimile document stored in said second memory matches the first password of the first user previously registered in said first buffer of said first memory;

determining whether the input password for printing the facsimile document stored in said second memory matches the second password of the second user previously registered in said second buffer of said first memory:

when the input password matches the first password previously registered in said first buffer of said first memory, printing the facsimile document stored in said first buffer of said second memory;

when the input password matches the second password previously registered in said second buffer of said first memory, printing the facsimile document stored in said second buffer of said second memory; and when the input password does not match the first password previously registered in said first buffer of said first memory and does not match the second password previously registered in said second buffer of said first memory, denying printing of the facsimile document stored in said second memory.

9. The method of claim 8, further immediately printing the facsimile document as received from the telephone line, when the telephone number of the sending station does not match the first telephone number and does not match the second telephone number and does not match the third telephone number previously registered in said first memory.

10. The method of claim 9, further immediately rejecting reception of the facsimile document from the telephone line, when the telephone number of the sending station does not match the first telephone number and does not match the second telephone number and does not match the third telephone number previously registered in said first memory.

11. The method of claim 9, further immediately printing the facsimile document as received from the telephone line, when the automatic data storage function is not selected.

12. A facsimile system serving multiple operators, comprising:

a first memory including a first buffer for use by a first operator and a second buffer for use by a second operator;

a second memory including a first buffer for use by said first operator and a second buffer for use by said second operator;

an operating panel including a display unit, and a key input unit having at least a registration key for allowing said first operator to register a first password and a first plurality of telephone numbers of a first group of facsimile transmission sources in said first buffer of said first memory and for allowing said second operator to register a second password and a second plurality of telephone numbers of a second group of facsimile transmission sources in said second buffer of said first memory, and an automatic data storage key for allowing the facsimile system to be set to automatically and selectively store facsimile documents in said first and second buffers of said second memory; and controller means for controlling the registration of the first and second passwords and the first plurality and the second plurality of telephone numbers and the selective storing of facsimile documents in said first and second buffers of said second memory by:

registering the first password in said first buffer of said first memory;

registering the second password in said second buffer of said first memory;

registering the first plurality of telephone numbers of said first group of facsimile transmission sources in said first buffer of said first memory, when a reception-to-memory registration key is input;

registering the second plurality of telephone numbers of said second group of facsimile transmission sources in said second buffer of said first memory, when a reception-to-memory registration key is input;

receiving a facsimile signal from a sending station via a telephone line;

determining whether an automatic data storage function is selected;

determining whether a telephone number of the sending station matches any one telephone number of the first plurality of telephone numbers previously registered in said first buffer of said first memory, when the automatic data storage function is selected;

determining whether a telephone number of the sending station matches any one telephone number of the second plurality of telephone numbers previously registered in said second buffer of said first memory when the automatic data storage function is selected;

automatically storing a facsimile document in said first buffer of said second memory, when the telephone number of the sending station matches any one of the first plurality of telephone numbers previously registered in said first buffer of said first memory;

automatically storing the facsimile document in said second buffer of said second memory, when the telephone number of the sending station matches any one of the second plurality of telephone numbers previously registered in said second buffer of said first memory;

determining whether an input password for printing the facsimile document stored in said second memory matches the first password previously registered in said first buffer of said first memory;

determining whether the input password for printing the facsimile document stored in said second memory matches the second password previously registered in said second buffer of said first memory;

when the input password matches the first password previously registered in said first buffer of said first memory, printing the facsimile document stored in said first buffer of said second memory;

when the input password matches the second password previously registered in said second buffer of said first memory, printing the facsimile document stored in said second buffer of said second memory; and when the input password does not match the first password and does not match the second password previously registered in said first memory, denying printing of the facsimile document stored in said second memory.

13. The facsimile system of claim 12, further comprised of said controller means controlling immediate printing of the facsimile document as received from the telephone line, when the telephone number of the sending station does not match any one of the first plurality of telephone numbers and does not match any one of the second plurality of telephone numbers previously registered in said first memory.

14. The facsimile system of claim 12, further comprised of said controller means controlling immediate rejection of reception of the facsimile document from the telephone line, when the telephone number of the sending station does not match any one of the first plurality of telephone numbers and does not match any one of the second plurality of telephone numbers previously registered in said first memory.

15. The facsimile system of claim 12, further comprised of said controller means controlling immediate printing of the facsimile document as received from the telephone line, when the automatic data storage function is not selected.

16. A method of storing documents for secured retrieval in a facsimile system connected to a telephone line, comprising the steps of:

determining whether a registration function is selected;

when the registration function is selected first, registering a first password intended for operation by a first operator and a first plurality of telephone numbers of first facsimile transmission sources for storage in a first buffer of a first memory;

when the registration function is selected second, registering a second password intended for operation by a second operator and a second plurality of telephone numbers of second facsimile transmission sources for storage in a second buffer of said first memory;

receiving a facsimile signal of a sending station from the telephone line;

determining whether an automatic data storage function is selected when the automatic data storage function is selected, determining whether a telephone number of the sending station matches one of the telephone numbers previously registered in said first memory;

storing a facsimile document from the sending station in a first buffer of a second memory, when the telephone number of the sending station matches one of the telephone numbers of the first plurality of telephone numbers previously registered in said first buffer of said first memory;

storing the facsimile document from the sending station in a second buffer of said second memory when the telephone number of the sending station matches one of the telephone numbers of the second plurality of telephone numbers previously registered in said second buffer of said first memory:

printing the facsimile document as stored in said first buffer of said second memory, when a password input via an operational panel for retrieval matches the first password previously registered in said first buffer of said first memory; and printing the facsimile document as stored in said second buffer of said second memory, when the password input via the operational panel for retrieval matches the second password previously registered in said second buffer of said first memory.

17. The method of claim 16, further comprised of denying printing the facsimile document as stored in said second memory, when the password input from the operational panel does not match the first password and does not match the second password previously registered in said first memory.

18. The method of claim 16, further immediately printing the facsimile document as received from the telephone line, when the telephone number of the sending station does not match any one of the first plurality of telephone numbers and does not match any one of the second plurality of telephone numbers previously registered in said first memory.

19. The method of claim 16, further immediately rejecting reception of the facsimile document from the telephone line, when the telephone number of the sending station does not match any one of the first plurality of telephone numbers and does not match any one of the second plurality of telephone numbers previously registered in said first memory.

20. The method of claim 16, further immediately printing the facsimile document as received from the telephone line, when the automatic data storage function is not selected.

* * * * *